US008082756B2

(12) United States Patent
Conte et al.

(10) Patent No.: US 8,082,756 B2
(45) Date of Patent: Dec. 27, 2011

(54) METHOD FOR IMPROVING THE EDGING OF AN OPTICAL ARTICLE BY PROVIDING A TEMPORARY LAYER OF AN ORGANIC MATERIAL

(75) Inventors: Dominique Conte, Charenton-le-Pont (FR); Gérald Fournand, St. Petersburg, FL (US); Agnès Jallouli, St. Petersburg (FR); Laurianne Vagharchakian, Charenton-le-Pont (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 1312 days.

(21) Appl. No.: 11/612,960

(22) Filed: Dec. 19, 2006

(65) Prior Publication Data

US 2007/0183056 A1   Aug. 9, 2007

Related U.S. Application Data

(63) Continuation-in-part of application No. 11/311,928, filed on Dec. 19, 2005, now abandoned.

(51) Int. Cl.
C03C 17/00 (2006.01)
C03C 17/28 (2006.01)
C03C 17/32 (2006.01)
C03C 19/00 (2006.01)
B24B 1/00 (2006.01)

(52) U.S. Cl. .................. 65/60.3; 65/24; 65/26; 65/60.1; 451/41; 451/42; 451/43; 451/44; 451/390

(58) Field of Classification Search ............ 451/43, 451/390; 65/24, 26, 60.1, 60.3
See application file for complete search history.

(56) References Cited

U.S. PATENT DOCUMENTS

| 2,392,768 A | 1/1946 | Ryan ........................ 428/436 |
| 2,536,075 A | 1/1951 | MacNutt ........................ 134/28 |
| 4,085,248 A | 4/1978 | Zehender et al. ............ 428/336 |
| 4,387,960 A | 6/1983 | Tani ............................ 359/588 |
| 4,410,563 A | 10/1983 | Richter et al. ............... 427/108 |
| 4,826,548 A | 5/1989 | Herbin et al. ............... 156/152 |
| 4,959,118 A | 9/1990 | Herbin et al. ............... 456/512 |
| 5,211,759 A | 5/1993 | Zimmermann et al. ...... 118/723 |
| 5,328,768 A | 7/1994 | Goodwin ..................... 428/428 |
| 5,582,907 A | 12/1996 | Pall ............................ 442/351 |
| 5,680,013 A | 10/1997 | Dornfest et al. ......... 315/111.21 |
| 5,792,537 A | 8/1998 | Ohlin, Jr. .................... 428/45 |
| 5,800,918 A | 9/1998 | Chartier et al. ............. 428/336 |
| 5,919,563 A | 7/1999 | Parish, Jr. et al. ........... 428/354 |
| 6,143,143 A | 11/2000 | Walls et al. ............. 204/192.26 |
| 6,143,358 A | 11/2000 | Singh et al. ................. 427/162 |
| 6,149,750 A | 11/2000 | Parish, Jr. et al. ........... 156/154 |
| 6,183,872 B1 * | 2/2001 | Tanaka et al. ............... 428/429 |
| 6,277,485 B1 | 8/2001 | Invie et al. .................. 428/336 |
| 6,364,823 B1 | 4/2002 | Garibaldi et al. ............ 600/12 |
| 6,413,413 B1 | 7/2002 | Smith, Jr. .................... 208/213 |
| 6,682,773 B2 | 1/2004 | Medwick et al. ............ 427/154 |
| 6,863,965 B2 | 3/2005 | Fujinawa et al. ............ 428/215 |
| 6,884,432 B2 | 4/2005 | Yaszemski et al. .......... 424/460 |
| 7,635,523 B2 * | 12/2009 | Goetz et al. ................. 428/447 |
| 2001/0051700 A1 * | 12/2001 | Matsukura et al. .......... 526/247 |
| 2003/0049370 A1 * | 3/2003 | Lacan et al. ................. 427/165 |
| 2003/0059623 A1 | 3/2003 | O'Shaughnessy et al. ... 428/428 |
| 2005/0115923 A1 * | 6/2005 | Lacan et al. ................. 216/26 |
| 2006/0246278 A1 | 11/2006 | Lacan et al. ................. 428/336 |
| 2007/0141358 A1 | 6/2007 | Jallouli et al. ............... 428/426 |
| 2007/0172622 A1 * | 7/2007 | Goetz et al. ................. 428/41.7 |

FOREIGN PATENT DOCUMENTS

| EP | 0203730 | 12/1986 |
| EP | 0614957 | 3/1994 |
| EP | 749021 | 12/1996 |
| EP | 0844265 | 5/1998 |
| EP | 933377 | 8/1999 |
| FR | 2613275 | 3/1987 |
| JP | 60135167 | 7/1985 |
| JP | 2004-122238 | 4/2004 |
| JP | 2004-148444 | 5/2004 |
| WO | WO 97/10923 | 3/1997 |
| WO | WO 00/68326 | 11/2000 |
| WO | WO 01/02496 | 1/2001 |
| WO | WO 02/092524 | 11/2002 |
| WO | WO 03/006704 | 1/2003 |
| WO | WO 03/057641 | 7/2003 |
| WO | WO 2005/012955 | 2/2005 |
| WO | WO 2005/015270 | 2/2005 |
| WO | WO 2006/092002 | 9/2006 |
| WO | WO 2006092002 A1 * | 9/2006 |

OTHER PUBLICATIONS

March, *Advanced Organic Chemistry*, 4th ed., John Wiley & Sons, pblishers, 1992.
Owens and Wendt, "Estimation of the surface force energy of polymers," *J Appl. Polym. Sci*, 13:1741-1747, 1969.
Sobieski and Tangney., *Handbook of Pressure-Sensitive Adhesive Technology*, 2nd Ed., D. Satas, ed., Van Nostrand Reinhold, New York, pp. 508-517, 1989.
U.S. Appl. No. 10/573,692, filed Mar. 27, 2006, Lacan et al.
Database WPI, Section CH, Week 198819, Derwent Publications Ltd., London, GB, XP002214922, 1987.
Gutowski, "The relationship between strength adhesive bond and the thermodynamic properties of its components," *Int. J. Adhesion and Adhesives*, 7:189-198, 1987.
Kimm Institute Report regarding 3M™ surface Saver™ films, May 6, 2006.

* cited by examiner

*Primary Examiner* — Khanh P Nguyen
*Assistant Examiner* — Carson Gross
(74) *Attorney, Agent, or Firm* — FulBright & Jaworski L.L.P.

(57) ABSTRACT

Methods for edging optical articles comprising two main faces, at least one of which being coated with an outermost layer comprising fixing the optical article to a chuck with a holding pad that adheres to both the optical article and the chuck, wherein the surface of the holding pad contacting the optical comprises an adhesive material; and edging the optical article with an edging device; wherein prior to fixing the optical article to the chuck, at least one temporary layer of an organic material is formed onto said outermost layer of the optical article, the organic material of the temporary layer comprising at least one organic compound having a fluorinated functional moiety and at least one linking functional moiety capable of establishing at least one intermolecular bond or interaction with the adhesive material of the holding pad. Optical articles obtained via these methods.

42 Claims, No Drawings

METHOD FOR IMPROVING THE EDGING OF AN OPTICAL ARTICLE BY PROVIDING A TEMPORARY LAYER OF AN ORGANIC MATERIAL

CROSS-REFERENCE TO RELATED APPLICATIONS

This application is a continuation-in-part of co-pending U.S. patent application Ser. No. 11/311,928 filed Dec. 19, 2005, the entire text of which disclosure is specifically incorporated by reference herein without disclaimer.

BACKGROUND OF THE INVENTION

1. Field of the Invention

The present invention relates to the field of edging optical articles, such as ophthalmic lenses, more particularly those comprising, as an outermost layer, an anti-fouling top coat such as a hydrophobic and/or oleophobic surface coating.

An ophthalmic lens results from a succession of molding and/or surfacing/smoothing operations determining the geometry of both convex and concave optical surfaces of said lens, followed by appropriate surface treatments.

The last finishing step of an ophthalmic lens is the edging operation consisting in machining the edge or the periphery of the glass so as to shape it according to the required dimensions to fit the lens into the eyeglass frame wherein it is to be arranged.

Edging is conventionally performed on a grinding machine comprising diamond abrasive wheels that perform the machining step as defined hereinabove.

The lens is held, upon such an operation, by axially acting blocking members.

The relative motion of the lens with respect to the grinding wheel is monitored, generally digitally, so as to provide the desired shape.

As it appears, it is absolutely imperative that the lens be firmly maintained upon such a movement. To this end, before the edging operation, a lens-blocking step is performed, i.e. a holding means or chuck is positioned on the convex surface of the lens.

A holding pad, preferably a two-sided adhesive, is arranged between the chuck and the convex surface of the lens.

The so-equipped lens is positioned on one of the above-mentioned axial blocking members, the second axial blocking member clamping then the lens on the concave surface thereof by means of an abutment, generally made of an elastomer.

Upon the machining step, a tangential torque stress is generated on the lens, which may result in a rotation of the lens relative to the chuck if the lens holding means is not sufficiently efficient.

The good holding of the lens mainly depends on the good adhesion at the interface of holding pad/convex surface of the lens.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is an usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat) and an anti-reflection coating.

The last generation ophthalmic lenses most often also comprise an external layer of anti-fouling material deposited on the anti-reflection coating, in particular an anti-reflection coating made of an inorganic material, so as to reduce their strong tendency to staining, for example towards fatty deposits. Such an anti-fouling top coat is generally a hydrophobic and/or oleophobic coating, which reduces the surface energy so as to avoid the adhesion of fatty stains, which are thus easier to remove. The hydrophobic top coat constitutes, in the finished optical article, the outermost coating.

Such top coats are well known in the art and are usually made of fluorosilanes or fluorosilazanes i.e., silicones or silazanes bearing fluorine-containing groups. Examples of classical materials for top coats are OPTOOL DSX, which is a fluorine-based resin comprising perfluoropropylene moieties, commercialized by Daikin Industries, KY130 from Shin-Etsu Chemical and KP 801M, also commercialized by Shin-Etsu Chemical. These coatings impart to the lens a contact angle with water of at least 100°.

This type of surface coating may be of such efficiency that the surface energy is considerably decreased. As a consequence, the adhesion at the pad/convex surface interface can be thereby altered, making difficult satisfactory edging operations, in particular for polycarbonate lenses, the edging of which generates much more important stresses in comparison with other materials.

High slipperiness of the lens surface may result in substantially shifting the center of the lens from the lens chuck in which the center of the lens is fixed, thus shifting the optical and horizontal/vertical axes of the lens from the real center thereof. This phenomenon possibly leads to depreciation of vision correcting effects and/or lowering of the visual power of the user wearing the eyeglass, and/or impossibility to insert the lens into the desired frame. The consequence of a badly performed edging operation is thus the pure and simple loss of the lens.

To solve these problems, it has been found advantageous to deposit on the outermost layer of the lens a temporary film.

An effective solution is to deposit on the outermost layer of the lens a temporary coating imparting a surface energy of at least 15 mJ/m$^2$, in particular a MgF$_2$ temporary layer, such as disclosed by the applicant in French Patent No 2824821. This solution is applicable whatever the deposition process of the anti-fouling top coat and especially if the anti-fouling top coat is deposited through vacuum evaporation. However, if the anti-fouling top coat is deposited by dip coating, the lenses may be more difficult to edge, particularly if said top coat is OPTOOL DSX from Daikin Industries. Moreover, lenses having their external layer coated with a temporary MgF$_2$ layer may sometimes not be edged for 48 hours following deposition of such a temporary layer.

Such a method was further improved in French Patent No 2856056 in the name of the present applicant, which describes ophthalmic lenses coated with said MgF$_2$ temporary layer, on which a layer of at least one non fluorinated metallic oxide and/or at least one non fluorinated metallic hydroxide has been deposited or created. The additional layers enable to perform the edging operation very quickly after the various layers have been deposited on the lens. However, the deposition or creation of such layers lengthens the process.

Japanese Patent Application published under No JP2004-122238 discloses a method to prevent slippage of a lens coated with an anti-fouling top coat during edging operation.

The method comprises in a first step deposition onto the hydrophobic and/or oleophobic top coat of a first layer made of a resin material such as poly(vinyl acetate) and then in a second step sticking on said first layer an adhesive film made of a material such as polyethylene, polyethylene terephthalate (PET) or polypropylene. Adhesion of the first layer to the film is promoted by a silicone binder. The lens can then be fixed to the support of the edging machine by using a two-sided adhesive tape.

International Patent Application WO 2005/015270 to S. W. Nam describes formation on the surface of a lens of a temporary film exhibiting a greater coefficient of friction than the lens, in order to prevent a shift of axes and surface damage when processing the lens. The film is formed from a chlorinated polyolefin resin or PET, preferably a chlorinated polypropylene resin and is generally deposited onto a fluorinated anti-fouling material or a water repellent layer.

SUMMARY OF THE INVENTION

The present invention has been made in view of the above problems, and it is an object of the present invention to provide a temporary coating that would prevent slippage of the lens during edging operations, thus substantially decreasing and even eliminating the offset of the lens, and moreover that would allow to have adhesion of ink markings at the surface of the lens.

To this end, the invention relates to a method for edging an optical article comprising the following steps:
providing an optical article having two main faces, at least one of which being coated with an outermost layer;
fixing the optical article to a chuck by means of a holding pad inserted there between and adhering to both the optical article and the chuck, the surface of the holding pad to be contacted with the optical article being coated with an adhesive material; and
edging the optical article with an edging device;
wherein prior to the step of fixing the optical article to the chuck, at least one temporary layer, in particular a temporary protective layer, of an organic material is formed onto said outermost layer of the optical article, the organic material of the temporary layer comprising at least one organic compound having a fluorinated functional moiety, and a linking functional moiety capable of establishing at least one intermolecular bond or interaction with the adhesive material of the holding pad.

In a preferred embodiment, said organic compound has a main chain with two terminal positions, the first terminal position being occupied by the fluorinated functional moiety, and the second terminal position being occupied by the linking functional moiety capable of establishing at least one intermolecular bond or interaction with the adhesive material of the holding pad.

In another preferred embodiment, said linking functional moiety is able to form hydrogen bonds with the adhesive material present at the surface of the holding pad.

The inventive temporary layer allows achieving a sufficient adhesion at the interface holding pad/optical articles for pads conventionally used in the technical field.

Another embodiment of the instant invention is an optical article having two main faces, at least one of which being coated with an outermost layer, wherein at least one temporary layer of an organic material is formed on said outermost layer of said optical article, the organic material of the temporary layer comprising at least one organic compound having a fluorinated functional moiety, and a linking functional moiety capable of establishing at least one intermolecular bond or interaction, preferably with an adhesive material, more preferably with a pressure-sensitive adhesive.

Another embodiment of the instant invention is a method for preparing the above optical article, comprising the steps of:
providing an optical article having two main faces, at least one of which being coated with an outermost layer,
forming at least one temporary layer of an organic material on the outermost layer of said optical article, by coating said outermost layer with a coating solution containing at least one organic compound having a fluorinated functional moiety, and a linking functional moiety capable of establishing at least one intermolecular bond or interaction, preferably with an adhesive material, more preferably with a pressure sensitive adhesive.

The temporary layer in accordance with the present invention and methods for forming such a layer are described in more detail in the following description.

In a most preferred embodiment the temporary layer has a surface energy ranging from 12 to 15 $mJ/m^2$ and an hysteresis of the water contact angle of at least 8°, preferably at least 9° and most preferably at least 10°.

Other objects, features and advantages of the present invention will become apparent from this description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements.

The optical articles used in the process of the invention are preferably ophthalmic lenses. Herein, the term "lens" means an organic or inorganic glass lens, either treated or not, depending whether it comprises one or more coatings of various natures or whether it is naked.

A "chuck" or "clamping device" or "blocking means" or "block" as used herein is intended to mean a device for holding the optical article during edging operations.

When the lens comprises one or more surface coatings, the term "to deposit a layer onto the lens" means that a layer is deposited onto the outermost coating of the lens.

According to the invention, there is provided a method for improving the edging operation of an optical article, which involves the step of providing at least one, preferably one temporary layer of an organic material designed to have an affinity for both the material of the outermost layer of the optical article and the adhesive material which is present at the surface of the holding pad, which can be referred to as "the glue of the pad". If there is more than one temporary layer, those temporary layers form a temporary coating.

More precisely, the organic material used herein has been designed to promote adhesion to both the adhesive material of the holding pad and the outermost layer of the optical article.

The temporary layer of organic material is deposited onto the outermost layer of the optical article. Thus, the temporarily protected surface of the optical article is rendered apt to edging since it exhibits an increased affinity toward the surface of the holding pad.

The outermost layer of the optical article is preferably an anti-fouling top coat. The outermost anti-fouling surface coating is generally deposited on a mono- or multilayered anti-reflection coating or a hard coating, and reduces the surface energy of the optical article.

The anti-fouling top coat according to the invention is preferably of organic nature. By organic nature, it is meant a layer which is comprised of at least 40% by weight, preferably at least 50% by weight of organic materials, relative to the total weight of the coating layer.

A preferred anti-fouling top coat is a hydrophobic and/or oleophobic surface coating, and more preferably an anti-fouling top coat made from a composition comprising at least one fluorinated compound.

Hydrophobic and/or oleophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in Patents U.S. Pat. No. 4,410,563, EP 0203730, EP 749021, EP 844265 and EP 933377.

A known method to form an anti-fouling top coat consists in depositing, on the anti-reflection coating, compounds bearing fluorinated groups and Si—R groups, R representing an —OH group or a precursor thereof, such as —Cl, —NH$_2$, —NH— or —O-alkyl, preferably an alkoxy group. Such compounds may perform, at the anti-reflection coating surface, directly or after hydrolysis, polymerization and/or cross-linking reactions with pendent reactive groups.

Preferred fluorinated compounds are silanes and silazanes bearing at least one group selected from fluorinated hydrocarbons, perfluorocarbons, fluorinated polyethers and perfluoropolyethers, in particular perfluoropolyethers.

Among fluorosilanes there may be cited the compounds of formulae:

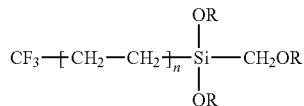

wherein n=5, 7, 9 or 11 and R is an alkyl group, typically a $C_1$-$C_{10}$ alkyl group such as methyl, ethyl and propyl;

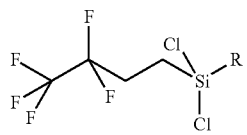

wherein n'=7 or 9 and R is as defined above.

Compositions containing fluorosilanes compounds also useful for making hydrophobic and/or oleophobic top coats are disclosed in U.S. Pat. No. 6,183,872. Such compositions comprise silicon-containing organic fluoropolymers represented by the below general formula and having a number average molecular weight of from $5 \times 10^2$ to $1 \times 10^5$.

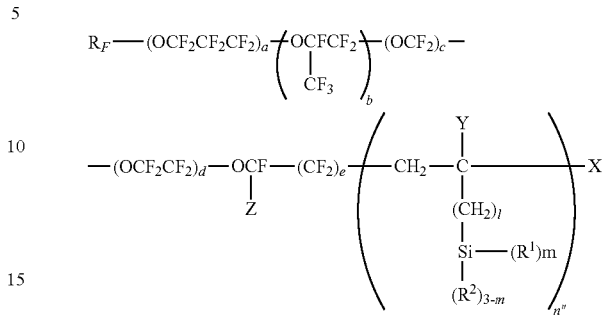

wherein $R_F$ represents a perfluoroalkyl group, Z represents a fluorine atom or a trifluoromethyl group, a, b, c, d and e each independently represent 0 or an integer equal to or higher than 1, provided that a+b+c+d+e is not less than 1 and the order of the repeating units parenthesized by subscripts a, b, c, d and e occurring in the above formula is not limited to that shown; Y represents a hydrogen atom or an alkyl group containing 1 to 4. carbon atoms; X represents a hydrogen, bromine or iodine atom; $R^1$ represents a hydroxyl group or a hydrolyzable substituent group; $R^2$ represents a hydrogen atom or a monovalent hydrocarbon group; l represents 0, 1 or 2; m represents 1, 2 or 3; and n" represents an integer equal to or higher than 1, preferably equal to or higher than 2.

Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485. The anti-fouling top coats of U.S. Pat. No. 6,277,485 are at least partially cured coatings comprising a fluorinated siloxane prepared by applying a coating composition (typically in the form of a solution) comprising at least one fluorinated silane of the following formula:

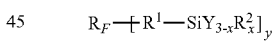

wherein $R_F$ is a monovalent or divalent polyfluoro polyether group; $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a molecular weight (number average) of at least about 1000. Preferably, Y is a lower alkoxy group and $R_F$ is a perfluoro polyether group.

Commercial compositions for making anti-fouling top coats are the compositions KY130 and KP 801 M commercialized by Shin-Etsu Chemical and the composition OPTOOL DSX (a fluorine-based resin comprising perfluoropropylene moieties) commercialized by Daikin Industries. OPTOOL DSX is the most preferred coating composition for anti-fouling top coats.

Applying compounds reducing the lens surface energy conventionally occurs by dipping in a solution of said compound, centrifugation or vapor phase deposition, amongst others. Generally, the hydrophobic and/or oleophobic coating has a physical thickness lower than 30 nm, preferably ranging from 1 to 20 nm, more preferably ranging from 1 to 10 nm.

The outermost layer of the lens can also be a mono- or multilayered anti-reflection coating, preferably a multilayered anti-reflection coating which outermost coating layer is a hydrophobic layer, preferably comprising at least one fluorinated compound. Said layer is generally deposited in liquid phase. An example of such multilayered anti-reflection coating is disclosed in international patent application WO 2005/012955, where the hydrophobic outermost layer is a low refractive index layer deposited by spin coating of a composition comprising at least one hydrolyzable fluorosilane.

The invention is preferably carried out with optical articles coated with an outermost layer having a surface energy lower than or equal to 14 mJoules/m$^2$, more preferably lower than or equal to 13 mJ/m$^2$ and even more preferably lower than or equal to 12 mJ/m$^2$ (the surface energies being calculated according to the Owens-Wendt method disclosed in the following reference: "Estimation of the surface force energy of polymers" Owens, D. K.; Wendt R. G. *J. Appl. Polym. Sci.* 1969, 13, 1741-1747). Such values of the surface energy are generally imparted by hydrophobic and/or oleophobic surface coatings.

It is preferred that the temporary layer according to the invention formed on the outermost surface of the optical article imparts to said optical article a surface energy sufficient for retaining purposes, i.e., a surface energy at least equal to 12 mJ/m$^2$, preferably at least equal to 15 mJ/m$^2$, more preferably 20 mJ/m$^2$. Obviously, if there is more than one temporary layer, the former surface energy is the surface energy of the external layer of the temporary coating.

Using the process of the invention, the inventors noticed that the surface energy of the temporary layer may sometimes be lower than 15 mJ/m$^2$ and still provide good adhesion to the pad.

In particular, good adhesion to the pad is achieved with temporary layers having surface energy ranging from 12 to 15 mJ/m$^2$ and the hysteresis of the water contact angle is at least 8°, preferably at least 9° and better at least 10°. Hysteresis of water contact angle may be as high as 25° and even up to 50°.

Hysteresis of 11°, 12°, 13° and up to 15° are commonly achievable.

As known, the water contact angle hysteresis ($\Delta\theta$) is the difference between the advancing water contact angle ($\Delta a$) and the receding water contact angle ($\theta_r$) ($\Delta\theta=\theta_a-\theta_r$).

These contact angles are commonly determined by injecting and pumping, with a syringe, liquid to and from a water drop deposited on the surface.

The advancing contact angle ($\theta_a$) is the contact angle at which liquid injection to the drop imparts an advancing movement to the interface line air/water/surface.

The receding contact angle ($\theta_r$) is the contact angle at which liquid pumping from the drop imparts a receding movement to the interface line air/water/surface.

After deposition of the inventive temporary layer, the next step of the process in accordance with the invention is a fixing step of the optical article to a "chuck" by means of a holding pad inserted between the optical article and the "chuck", such as routinely performed by the person skilled in the art.

The holding pad to be inserted between the optical article and the chuck is not particularly restricted, provided that it is capable of adhering to both the chuck and the temporary organic layer of the invention. The holding pad is preferably a double-sided self-adhesive film.

A large variety of adhesive holding pads are commercially available, for example, from 3M, albeit they can be easily prepared through deposition of an adhesive composition layer onto a pad by any of the techniques known in the art, such as dip coating, flow coating, spin coating or dry transfer.

The surface of the holding pad to be contacted with the optical article is coated with an adhesive material. The adhesive material can be of any kind, provided that it promotes adhesion of the holding pad to the temporary layer according to the invention. The adhesive material is preferably a pressure-sensitive adhesive (PSA). The surface of the holding pad adhering to the chuck may also be coated with an adhesive material, which may be identical to or different from that of the other side.

By "pressure-sensitive adhesive" (or sometimes "self-adhesive material"), it is meant a distinct category of adhesives. PSAs are aggressively and permanently tacky in dry form (solvent-free) at room temperature or at temperature of use. They are characterized by their ability to firmly adhere to a variety of dissimilar surfaces under a slight pressure by forming Van der Waals bonds with said surfaces. In any case, no other external energy (such as temperature, solvent, UV . . . ) but pressure is compulsory to form the adhesive joint. However, other external energy may be used to enhance the adhesive performance. Another requirement is that PSAs should have a sufficient cohesive strength to be removed by peeling without leaving residues to said surfaces. PSAs are available into three forms: solvent borne, water borne (latex) and the form obtained by hot melt process.

The surface of the holding pad may be coated with PSA layers from the following families, depending on the main elastomer used in the adhesive formulation: natural rubber based PSAs, polyacrylates based PSAs (such as polyethylhexyl acrylate, poly n-butyl acrylate), styrenic block copolymers based PSAs [such as Styrene-Isoprene (SI), Styrene-Isoprene-Styrene (SIS), Styrene-Butadiene (SB), Styrene-Butadiene-Styrene (SBS)], and mixtures thereof. Styrene-butadiene random copolymers, butyl rubber, polyisobutylene, silicon polymers, synthetic polyisoprene, polyurethanes, polyvinyl ethyl ethers, polyvinyl pyrrolidone, and mixtures thereof, may also be used as bases for PSA formulations. For examples, see Sobieski et al., *Handbook of Pressure-Sensitive Adhesive Technology,* 2nd ed., pp. 508-517 (D. Satas, ed.), Van Nostrand Reinhold, New York (1989), incorporated by reference in its entirety.

According to the invention, the organic material of the temporary layer (or coating layers) comprises at least one organic compound having a fluorinated functional moiety, so as to possibly interact with the outermost layer of the optical article, which is preferably an anti-fouling top coat, and a linking functional moiety, which has the ability to establish at least one intermolecular bond or interaction with the adhesive material present at the surface of the holding pad.

Each of those moieties has been designed to promote adhesion to at least one layer of material. Of course, any of those moieties of said organic material may interact with both the outermost layer of the lens and the holding pad, depending on the nature of the adhesive material present at the surface of the holding pad.

The organic compound preferably has a main chain with two terminal positions, the first terminal position being occupied by the fluorinated functional moiety, and the second terminal position being occupied by the linking functional moiety capable of establishing at least one intermolecular bond or interaction with the adhesive material of the holding pad.

Said fluorinated functional moiety and said linking functional moiety may be connected to each other with various linking arms. The coating material for the temporary layer may comprise a mixture of such organic compounds, but preferably comprises only one organic compound, more preferably consists in one such organic compound.

It is particularly surprising to see that fluoro compounds, generally known as compounds decreasing the adhesion, can be used to obtain adhesion of the pad in the edging process, once they are deposited onto the outermost layer of the optical article.

Preferably, the organic compound of the temporary layer is different from the fluorinated compound which may be comprised in the composition for forming the outermost layer of the optical article, which is generally a composition for an anti-fouling top coat.

The coating material for forming the at least one temporary layer of the invention preferably comprises compounds of general formula (I):

Compounds (I) have a fluorinated functional moiety $R_{F,H}$ on one side, and a linking functional moiety L on the other side, both being connected by the linking arm A.

$R_{F,H}$ is preferably a linear or branched perfluoroalkyl, perfluorooxyalkyl, perfluoroalkylthio, fluoroalkyl (that means an alkyl group comprising at least one fluorine atom), fluorooxyalkyl, fluoroalkylthio group or a mixture thereof. $R_{F,H}$ may be polymeric, oligomeric or monomeric. Thus, $R_{F,H}$ may be a fluoropolyether or a perfluoropolyether group. $R_{F,H}$ is preferably oligomeric or monomeric. Preferred $R_{F,H}$ groups are perfluoroalkyl or fluoroalkyl groups, preferably those which can be represented by the following general formula:

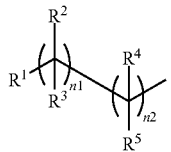

in which $R^1$ represents a trifluoromethyl, a difluoromethyl, a fluoromethyl or a methyl group, $R^2$ to $R^5$ each independently represent a fluorine or an hydrogen atom, $n_1$ and $n_2$ each independently represent un integer ranging from 0 to 10. An example of fluoroalkyl group is hexafluoro-2-propyl group. Preferred $R_{F,H}$ groups have 1 to 10 carbon atoms, more preferably 1 to 5, still more preferably 1 to 3.

In a preferred embodiment, $R_{F,H}$ is a linear group. $R_{F,H}$ is preferably a perfluoroalkyl group. In this case, $R_{F,H}$ is noted $R_F$. Preferred $R_F$ groups are trifluoromethyl, pentafluoroethyl, heptafluoro-n-propyl, nonafluoro-n-butyl, n-$C_5F_{11}$, n-$C_6F_{13}$ n-$C_7F_{15}$ and n-$C_8F_{17}$. Among those $R_F$ groups, the most preferred ones have less than four carbon atoms.

Indeed, short fluorinated functional moieties are more efficient than long fluorinated functional moieties in promoting holding of the lens during the edging operation. Moreover, removal of the temporary layer is made easier with short fluorinated functional moieties. Too long fluorinated functional moieties might lead to a strong binding of those moieties to the anti-fouling top coat and degradation of the anti-fouling top coat upon removal of the layer.

In general formula (I), A is a divalent group, including a covalent link. A is called "linking arm", or "linker group", the role of which being to connect $R_{F,H}$ groups to linking functional moieties L. The linking arm may be polymeric, oligomeric or monomeric, preferably oligomeric or monomeric. Divalent linking arms may be selected from, without limitation:

alkylene groups, linear or branched, substituted or not substituted;

cycloalkylene groups, substituted or not substituted;

alkenylene or alkynylene groups, substituted or not substituted;

divalent heteroarylene groups, substituted or not substituted;

arylene groups, substituted or not substituted;

acyl(cyclo)alkylene groups, acyl(cyclo)alkenylene groups, acyl(cyclo)alkynylene groups, acyl(cyclo)arylene groups, the acyl function being —C(O)—;

acyloxy(cyclo)alkylene groups, acyloxy (cyclo)alkenylene groups, acyloxy(cyclo)alkynylene groups, acyloxy(cyclo)arylene groups, the acyloxy function being —C(O)O—;

oxy(cyclo)alkylene groups, oxy(cyclo)alkenylene groups, oxy(cyclo)alkynylene groups, oxy(cyclo)arylene groups;

thio(cyclo)alkylene groups, thio(cyclo)alkenylene groups, thio(cyclo)alkynylene groups, thio(cyclo)arylene groups, sulfo (—$SO_2$—) derivatives thereof, sulfoxy (—S(O)—) derivatives thereof;

amino(cyclo)alkylene groups, amino(cyclo)alkenylene groups, amino(cyclo)alkynylene groups, amino(cyclo) arylene groups;

alkylamino(cyclo)alkylene groups, alkylamino(cyclo)alkenylene groups, alkylamino(cyclo) alkynylene groups, alkylamino(cyclo)arylene groups;

arylamino(cyclo)alkylene groups, arylamino(cyclo)alkenylene groups, arylamino(cyclo) alkynylene groups, arylamino(cyclo)arylene groups;

NHC(O), OC(O), C(O), NHS(O)$_2$, NHS(O), OC(O)OC (O), C(O)C(O) groups, which may be connected to $R_{F,H}$ groups as defined below:

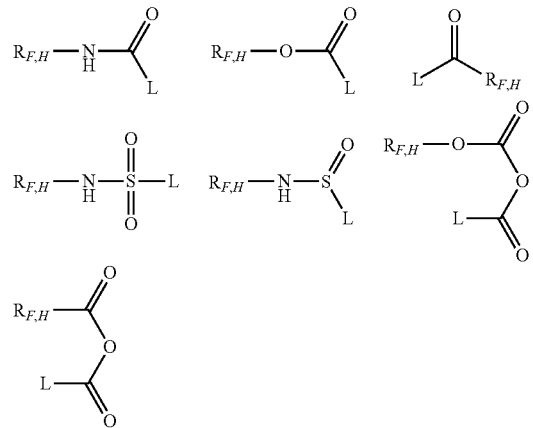

diorganosilylene groups, optionally substituted with an alkylene, arylene, alkenylene or alkynylene group;

or combinations of groups from the same or a different category, for example cycloalkylene-alkylene groups, biscycloalkylene groups, biscycloalkylene-alkylene groups, arylene-alkylene groups, biaryl groups, bisphenylene-alkylene groups, oxyalkenyl-alkylene groups, arylene-alcoxylene groups.

The term "arylene" as used herein includes phenylene and other divalent polycyclic fused ring compounds which contain at least one fully aromatic ring, such as, for example, naphthalene and 3,4-dihydronaphthalene.

The term "heteroarylene" as used herein refers to divalent monocyclic and polycyclic fused or non-fused ring containing compounds containing at least one heteroatom such as, for example, nitrogen, sulfur or oxygen or mixtures thereof within any of the rings and where at least one of the rings is aromatic. The ring or rings comprising the heteroatom may be three, four, five, six, seven or eight membered. The term "heteroarylene" is intended to include compounds that comprise partially or fully saturated rings, in addition to aromatic rings. The heteroatom may be situated in the partially or fully saturated rings or in the aromatic ring.

The above divalent linking arms are optionally substituted, without limitation, with alkyl, aralkyl or aryl groups or with one or more other groups selected from, for example, fluorine, chlorine, bromine, iodine, nitro, phenyl, hydroxyl, sulfide, thiol, amino, —NHR (where R is selected from: $C_1$-$C_6$ unsubstituted alkyl, optionally comprising heteroatoms chosen from O, N, S, F, P, and mixtures thereof, $C_2$-$C_6$ alkenyl or $C_2$-$C_6$ alkynyl; and aralkyl), —N(R)$_2$ (where R, identical or different, are selected from: $C_1$-$C_6$ unsubstituted alkyl, optionally comprising heteroatoms chosen from O, N, S, F, P, and mixtures thereof, $C_2$-$C_6$ alkenyl or $C_2$-$C_6$ alkynyl; and aralkyl), ester (i.e., —CO$_2$R, where R is selected from: $C_1$-$C_6$ unsubstituted alkyl, optionally comprising heteroatoms chosen from O, N, S, F, P, and mixtures thereof, $C_2$-$C_6$ alkenyl or $C_2$-$C_6$ alkynyl; and aralkyl), amide (i.e., —CONRR' where R and R' are independently selected from: hydrogen; $C_1$-$C_6$ unsubstituted alkyl, alkenyl or alkynyl; and aralkyl, groups as defined herein) and ethylene polyoxide. Heteroatoms, such as O, N, S, F, P, may be part of the above described chains or rings of the linking arms, or may be present in lateral substituents.

The term "aralkyl" as used herein refers to C $C_1$-$C_6$ alkyl substituted with aryl (e.g., benzyl).

Among preferred alkylene groups are arylalkylene or $C_1$-$C_{10}$ alkylene groups, for instance methylene —CH$_2$— and poly(methylene) groups of formula —(CH$_2$)$_n$— (n being an integer$\geq$2), such as ethylene, propylene, 1,4-butylene, isobutylene, tertiobutylene, 1,6-hexylene, octylene, n-dodecylene, n-octadecylene, n-tetradecylene, n-docosanylene, and $C_3$-$C_{10}$ branched alkylene groups such as 1,4-(4-methyl pentylene), 1,6-(2,2,4-trimethyl hexylene), 1,5-(5-methyl hexylene), n-ethyl-2-hexylene, 1,6-(6-methyl-heptylene), 1,5-(2,2,5-trimethyl hexylene), 1,7-(3,7-dimethyl octylene), 2,2-(dimethyl-propylene) and 1,6-(2,4,4-trimethyl hexylene). One may also use the following aryl alkylene group:

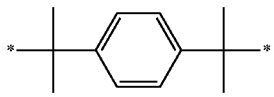

Among preferred cycloalkylene groups are cyclopentylene and cyclohexylene groups, optionally substituted, for example with alkyl groups, preferably 1,4-cyclohexylene.

Among preferred cycloalkylene-alkylene groups, one can use cyclohexylene-methylenes such as the isophorone group of formula:

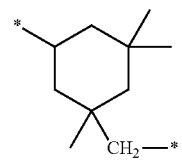

Among preferred biscycloalkylenealkylene groups, one can use the groups of formulae:

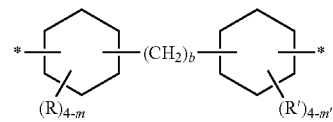

in which b is an integer ranging from 0 to 3, m is an integer ranging from 0 to 4; R and R' independently represent H, a $C_1$-$C_{12}$ alkyl group, optionally comprising heteroatoms chosen from O, N, S, F, Si and P; preferably a $C_1$-$C_4$ alkyl group, for instance methyl. The most preferred of such groups is 4,4'-methylene bis (cyclohexylene) group.

Among preferred arylene groups are phenylene groups (ortho, meta or para), optionally substituted with, for instance, a $C_1$-$C_{12}$ alkyl group which may comprise heteroatoms chosen from O, N, S, F, Si and P, alkylarylene such as tolylene and xylylene groups, for instance 2,4- and 2,6-tolylene, tetramethyl-xylylenes and naphthylene groups, for instance 1,5-naphtylene, 2,4-naphthylene or 2,6-naphthylene.

Among preferred arylene-alkylene groups, one can use optionally substituted phenylene-alkylene groups such as benzylene derivatives of formulae:

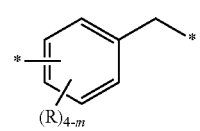

in which m is an integer ranging from 0 to 4; R is such as defined hereinabove.

Among preferred bisphenylene-alkylene groups, one can use the groups of formulae:

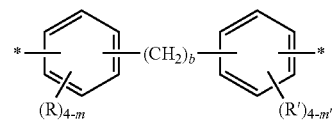

in which b is an integer ranging from 0 to 3, m is an integer ranging from 0 to 4; R and R' are such as defined hereinabove. A preferred group is 4,4'-biphenylenemethane. One can also use the bis-phenylene group and 4,4'-methylene groups of formulae:

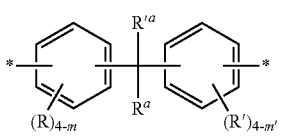

in which m is an integer ranging from 0 to 4; R and R' are such as defined hereinabove, $R^a$ and $R'^a$, independently represent H or a $C_1$-$C_4$ alkyl group, preferably methyl.

Alkenylene and alkynylene groups are preferably $C_1$-$C_{10}$ alkenylene and alkynylene groups.

Among preferred oxyalkylene groups are alkylene oxide groups of formulae —$(OR')_y$— wherein R', identical or different, preferably represent a $C_2$-$C_4$ linear or branched alkylene group, for instance ethylene or propylene, y is an integer ranging from 1 to 100, preferably from 1 to 10, more preferably from 1 to 5.

Among preferred divalent diorganosilylene groups, one can use the groups of formulae:

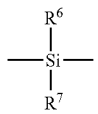

wherein $R^6$ and $R^7$ independently represent H, a linear or branched hydrocarbon group, saturated or unsaturated, cyclic or acyclic, optionally aromatic, preferably a phenyl or $C_1$-$C_{12}$ alkyl group which may comprise one or more heteroatoms identical or different chosen from O, N, S, P, F and Si, preferably O, N and S. In particular, $R^6$ and $R^7$ may be alkoxy or aryloxy groups. One can also use divalent diorganosiloxane groups of formulae:

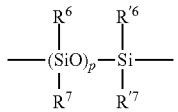

wherein $R^6$ and $R^7$, identical or different, are as defined above, $R'^6$ and $R'^7$, are defined in the same way as $R^6$ and $R^7$, p being an integer ranging from 1 to 100, preferably from 1 to 10, more preferably from 1 to 4. According to preferred embodiments of the invention, $R^6$, $R^7$, $R'^6$ and $R'^7$ are methyl or phenyl in both above formulae.

Non-limiting examples of divalent heteroarylene groups include divalent aryl-substituted piperazines, azo compounds, pyrazoles, thiazoles, oxazoles, 1,2,4-triazoles, benzothiazoles, benzotriazoles, pyrimidines, thiadiazines, pyridines, thiophenes, furans, azepines carbazoles, triazines, purines, pyrimidinones, pyridones, quinolines and iso-quinolines groups. Heteroarylene groups may comprise keto groups in the aromatic ring.

In a preferred embodiment of the invention, the linking arm A is a $C_1$-C4 n-alkyl group, more preferably methylene or ethylene.

In general formula (I), L is a chemical moiety, called "linking functional moiety" or "linking moiety", which is capable of forming at least one intermolecular bond or interaction with the adhesive material which is present at the surface of the pad, with the same or different moieties. Those chemical moieties L comprise at least one group prone to establish at least one intermolecular bond or interaction with the adhesive material which is present at the surface of the pad. Different categories of intermolecular bonds or interactions can be established between the linking moiety L and the adhesive material which is present at the surface of the pad, including, without limitation:

Covalent bonds, through chemical reaction of a reactive linking moiety L with a chemical group present in the adhesive material which is present at the surface of the pad, for instance an acrylate function. In such a case, an amount of $R_{F,H}$-A-L molecules of the temporary layer of the invention become part of the adhesive material which is present at the surface of the pad. A particular type of covalent bond which may be established is a donor-acceptor bond, i.e. a chemical bond where both electrons of the bonding pair originate from one atom only. Such a bond is also called a coordinate bond, a Lewis-type bond or a dative bond. The one partner who contributes both binding electrons is called the donor, the other the acceptor.

Non-covalent intermolecular bonds or interactions, such as a hydrogen bond, a van der Waals bond, a hydrophobic interaction, an aromatic CH-π interaction, a cation-π interaction or a charge-charge attractive interaction.

Covalent bonds (including donor-acceptor bonds) are strong primary bonds, while non-covalent bonds and intermolecular interactions are weaker secondary bonds.

Hydrogen bonds result from electrostatic interaction between an electron deficient or electropositive hydrogen atom, most of the time a hydrogen atom covalently bonded to a more electronegative (hetero)atom, which is called the hydrogen-bond donor, and, most of the time, a lone pair of a highly electronegative (hetero)atom, which is called the hydrogen-bond acceptor. These bonds are strongly directional. The strength of each hydrogen bond generally varies from 10 to 40 kJ/mol, depending on the nature and functionality of the donor and acceptors involved.

The terms electronegative and electropositive as used herein will be readily understood by the person skilled in the art to mean the tendency of an atom to attract the pair of electrons in a covalent bond so as to lead to an unsymmetrical distribution of electrons and hence the formation of a dipole moment. Electronegativity (see pages 14 to 16) and hydrogen bonding (see pages 75 to 79) are discussed more fully in, for example, *Advanced Organic Chemistry* by J. March, $4^{th}$ Edition, published by John Wiley & Sons, 1992.

Van der Waals bonds are non-directional electrostatic bonds between molecules or groups of atoms, involving non-specific attraction between permanent and/or induced dipoles.

Hydrophobic interactions may result from attraction between a hydrophobic linking moiety and a hydrophobic portion of the adhesive material which is present at the surface of the pad.

Aromatic CH-π interaction, also often incorrectly called "π-π stacking", results from the attractive electrostatic interaction of two aryl rings with each other.

Cation-π interactions result from electrostatic attraction between positively charged cations and, most of the time, the permanent negative area of the quadrupole of aromatic rings such as benzene. Those interactions also include interaction of acidic hydrogen atoms with aromatic rings or C═C double bonds.

Charge-charge interactions are electrostatic interactions between two different atoms in which one atom (the anion) donates its valence electrons to another atom (the cation). This bond is non-directional.

Preferred linking moieties L are hydrogen-bonding moieties, that means those moieties, which may establish at least one hydrogen bond with the adhesive material present at the surface of the pad. Thus, L comprises at least one hydrogen bond donor group or at least one hydrogen bond acceptor group or both, prone to establish at least one hydrogen bond with the adhesive material of the pad. In the first case, L can establish a hydrogen bond with a hydrogen bond acceptor moiety of the adhesive material present at the surface of the pad. In the second case, L can establish a hydrogen bond with a hydrogen bond donor moiety of the adhesive material present at the surface of the pad. In a preferred embodiment of the invention however, L comprises both at least one hydrogen bond donor group and at least one hydrogen bond acceptor group, which may both establish hydrogen bonds with an appropriate partner in the adhesive material present at the surface of the pad.

Linking moieties L may be simple functional groups such as OH or $NH_2$, or more complex moieties comprising at least one functional group prone to establish a hydrogen bond.

L preferably comprises at least one heteroatom selected from the group consisting of O, N, S, P and F, preferably O, S or N. Examples of hydrogen bond donor groups, which may be comprised in linking moieties L are:

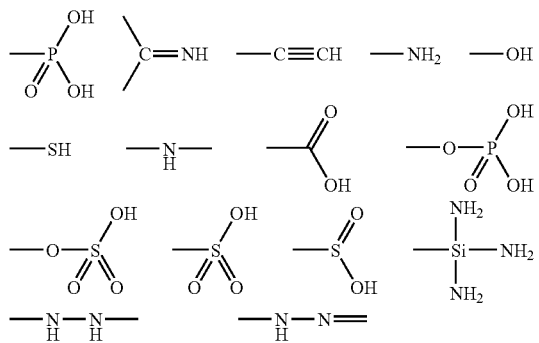

Some of the above functional groups may be present in the temporary layer of the invention on the form of an anionic salt, thus becoming hydrogen bond acceptor groups. Other examples of hydrogen bond acceptor groups, which may be comprised in linking moieties L of the invention, are:

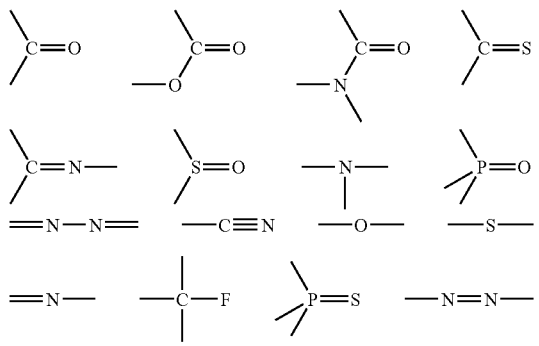

Some of the above hydrogen bond acceptor and donor functional groups can be part of a heteroaromatic ring. Suitable examples of hydrogen-bonding moieties include heterocycles and derivatives thereof, such as, for example, derivatives of pyrimidone, imidazole and triazine. It is sometimes possible in the case of, for example, heterocyclic compounds, for two or more structurally distinct compounds to exist in rapid equilibrium i.e., for tautomers to be present, usually through the shift of a proton. The amount of each tautomer present will be dependent upon, amongst other factors, relative stability. All or only certain of the tautomeric forms of a particular heterocycle may be suitable candidates for hydrogen-bonding moieties according to the present invention. However, the tautomers of a heterocycle are considered to fall within the scope of the present invention, as linking moieties L, only when they are capable of satisfying the requirement of being capable of forming at least one intermolecular bond or interaction with the adhesive material which is present at the surface of the pad, preferably a hydrogen bond.

In a preferred embodiment of the invention, L is a hydrogen bond donor moiety, more preferably a hydrogen bond donor functional group. Most preferred L groups are OH, $NH_2$ and $Si(NH_2)_3$.

Linking moieties L may also comprise ionic groups which may establish charge-charge interactions with ionic groups, if present, in the adhesive material at the surface of the pad, or cation-π interactions with aromatic groups, if present, in the adhesive material of the pad. Ionic groups may be cationic, anionic or zwitterionic (including amphoteric). Cationic groups are chosen, without limitation, from ammonium groups, for instance tetraalkylammonium groups or salts of amines, or salts of guanidino or amidino groups. Anionic groups are chosen, without limitation, from carboxylate, sulfonate, sulfate, sulfinate, phosphate, phosphonate, phenate and thiolate.

Linking moieties L may also comprise aromatic groups which may establish aromatic CH-π interactions or cation-π interactions.

It is well known in the art that, although hydrogen bonds in themselves may be relatively weak, at least compared to covalent bonds and charge-charge interactions, when a significant number of hydrogen bonds are capable of being formed, for example, between moieties from a first layer of material and moieties from a second layer of material, the overall interaction between the two layers may be relatively strong. The temporary layer of the invention and the material which is present at the surface of the pad may bond to each other substantially only as a result of hydrogen-bonding interactions. However, other weak non-covalent bonds or interactions may also contribute to the bonding such as, for example, van der Waals bonds, hydrophobic interactions, cation-π interactions or aromatic CH-π interactions (when the linking moiety L comprises one or more aromatic rings and/or one or more cationic groups).

Examples of preferred organic compounds which may be used as coating materials for forming the at least one temporary temporary layer of the invention, are compounds of formulae (II) to (V). The most preferred compound is 1H,1H-pentafluoropropan-1-ol of formula (II). Compounds (II), (III) and (V) are hydrogen bond donors (and acceptors), which meet general formula (I). Disiloxane compound (IV) is a precursor of such a hydrogen bond donor (and acceptor), since it may generate the corresponding silanol during coating of the lens upon hydrolysis. Organic compounds of the silanol type in accordance with the invention can be deposited either under their silanol form or under a protected form, such as a disiloxane or an alkoxysilane, which are easily deprotected.

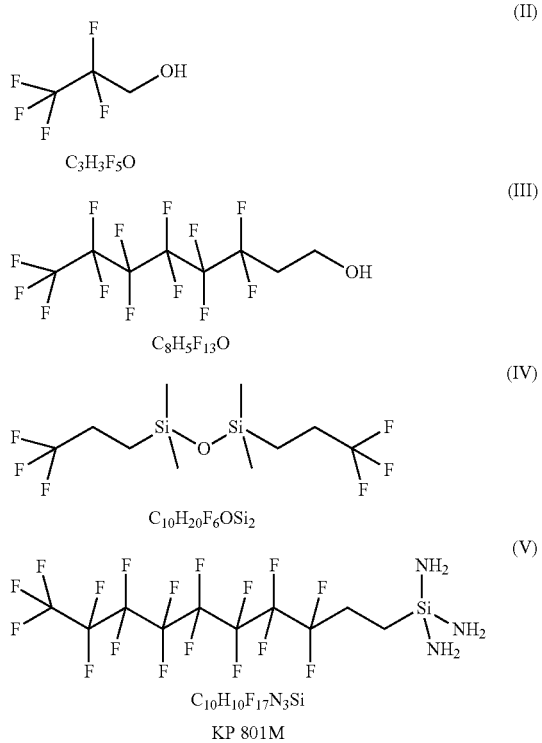

According to another embodiment of the invention, the temporary layer of the invention and the adhesive material present at the surface of the pad bond to each other as a result of strong interactions or bonds, such as covalent bonds and/or charge-charge attractive interactions (when the linking moiety L comprises one or more atoms bearing a positive or negative charge). In this case, the above described weak interactions may also contribute to the bonding, albeit to a lesser extent.

The one or more organic materials of the temporary layer can be applied onto the outermost layer of the optical article under a liquid form or in vapor phase, preferably under a liquid form.

When they are applied under a liquid form, at least one solvent is added to the coating material of the invention so as to prepare a liquid coating solution with a concentration and viscosity suitable for coating. In this connection, preferred solvents are fluorinated solvents and alcanols such as methanol, preferably fluorinated solvents. Examples of fluorinated solvents include any partially or totally fluorinated organic molecule having a carbon chain with from about 1 to about 25 carbon atoms, such as fluorinated alkanes, preferably perfluoro derivatives and fluorinated ether oxides, preferably perfluoroalkyl alkyl ether oxides, and mixtures thereof. As fluorinated alkanes, perfluorohexane ("Demnum" from DAIKIN Industries) may be used. As fluorinated ether oxides, methyl perfluoroalkyl ethers may be used, for instance methyl nonafluoro-isobutyl ether, methyl nonafluorobutyl ether or mixtures thereof, such as the commercial mixture sold by 3M under the trade name HFE-7100. Other solvents such as methyl ethyl ketone (MEK), toluene, or mixtures thereof provide layers which are less efficient in promoting holding of the lens.

The amount of solvent in the coating solution generally ranges from 10 to 95% in weight, preferably 20 to 90%. The amount of solvent in the coating solution is an important feature, because a too high concentration of coating material in the coating solution may lead to an unacceptably high offset of the lens during edging.

When the one or more organic materials of the temporary layer are applied in vapor phase, no solvent is added to the coating material to prepare the coating solution. In this case, the coating solution preferably consists in the coating material.

As previously indicated, the temporary coating of the invention can be monolayered or multilayered, preferably monolayered.

The prepared coating solution is coated to form the temporary layer of the invention using any appropriate conventional method, in vapor phase or in liquid phase. Dip coating by dipping the lens in the coating solution and drying, flow coating, spray coating, spin coating, brush coating, or vacuum deposition may be used, followed by drying of the solvent if one is used. Those techniques are well known in the art.

An advantage of using organic compounds comprising a fluorinated functional moiety when the temporary layer is deposited on an anti-fouling top coat, preferably fluorinated, is that spreading out of the organic coating composition is made easier due to favorable chemical interactions. Wettability problems are thus avoided.

Generally, anti-reflection, hydrophobic and/or oleophobic coatings have been deposited by evaporation in vacuum chambers and it is desirable to deposit the temporary layer with the same method, making it possible to perform all the operations successively, with no excessive handling of the lenses between the steps.

Another advantage of the vacuum deposition is to avoid any wettability problem in the case when the outermost layer onto which the temporary layer has just been deposited shows hydrophobic and/or oleophobic properties.

As previously indicated, the lenses which may be treated with the method according to the invention comprise two main faces, at least one of which comprising an outermost layer which may be coated with the above described temporary layer, preferably the concave side.

According to another embodiment of the invention, the two main faces of the optical article comprise an outermost layer coated with the temporary layer of the invention. It is then preferred that the first side on which the various layers are deposited be the concave side. Coating of this concave side with a temporary layer then makes it possible to protect such a side while the second side is being treated, especially if the treatment comprises treatment by activated species (ion bombardment for example). If desired, coating with the temporary layer may be made either on the convex surface or concave surface of the lens only.

Generally speaking, the temporary layer should have a satisfactory thickness so as to avoid any subsequent alteration of the properties of the outermost layer during the various processing steps of the lens, such as edging. Generally, if the temporary coating thickness is too low, there is the risk that the surface will be insufficiently modified. On the other hand, if the temporary layer thickness is too high, the expected adhesion of the pad may not be obtained. Physical thickness of the temporary layer used herein usually ranges from 1 to 100 nm, preferably from 5 to 100 nm, more preferably 1 to 50 nm and even better 5 to 50 nm, whatever the object it is deposited onto.

When it is deposited on the surface of the lens, the temporary layer can be applied on an area covering the whole surface of at least one of the two main faces of said optical article or only on the area of said optical article intended to be in contact with the holding pad. When it is deposited on the surface of the holding pad, it preferably covers the whole surface of the holding pad.

More precisely, it is usual to contact the holding pad, associated with the chuck, with the lens convex side. It is therefore possible to cover with the temporary layer the whole convex side or, alternatively, only a central area of the convex side, using a mask or any other appropriate technique.

The deposit has generally a continuous structure, but it can also have a discontinuous structure for example, like a pattern. In such a case, an irregular deposit is formed, with its surface remaining sufficient so as to provide the required adhesion of the holding pad. The discontinuous structure deposits can be obtained through tampography or ink jet printing.

However, the area covered by the temporary layer according to the invention should be such that the contact surface between the temporary layer and the holding pad would be sufficient to provide the adhesion of the lens to the pad.

Generally, the temporary layer covers at least 15%, preferably at least 20%, more preferably at least 30%, much more preferably at least 40%, and most preferably the whole surface of the lens on which the pad is to be adhered, i.e. generally the lens convex side.

Moreover, the lenses having a temporary layer in accordance with the invention may be subjected to markings using various inks, commonly used by the person skilled in the art, for progressive lenses.

Preferably, and more particularly when the temporary coating is deposited on a whole side of the lens faces, the material has some degree of transparency allowing conventional power measurements to be performed on the lens measurements using a frontofocometer.

Thus, the lens according to the invention preferably has a transmission rate of at least 18%, preferably at least 40% according to the ISO 8980/3 standard.

The lenses to be treated according to the process of the invention are lens blanks, which may be semi-finished lenses or finished lenses. A finished lens is a lens obtained in its definitive shape, having both of its main faces surfaced or cast to the required geometry. A semi-finished lens is a lens which comprises, after molding, only one of its main faces surfaced or cast to the required geometry, and wherein preferably one face of the lens, preferably the front face of the lens, has previously been treated with an appropriate coating (anti-reflection, hard coat, anti-fouling coating, impact resistant primer coating, etc . . . ). Its second face, preferably the rear face, has then to be coated and surface-finished as required. The lens blank can also be a polarized lens or a photochromic lens.

By rear face of the lens it is meant the face, which in use, will be the closest to the weaver's eye. Conversely, the front face of the lens is the face, which in use, will be the furthest to the weaver's eye.

As a result of depositing the temporary layer of the invention onto the outermost layer of the optical article, an optical article is obtained, being able to be edged. This means that after the edging operation, the optical article will have the required dimensions allowing for its suitable insertion into the glass frame wherein it is to be arranged.

The last step of the process of the invention is a conventional edging step of the fixed optical article with an edging device, well known by the person skilled in the art. It will consequently not be described in full detail. As written above, this step can be performed on a conventional grinding machine, without having to modify it, or in an extremely restricted way.

It is possible to overcome problems associated with shift of optical axis occurring when edging the lens, whatever the lens edging machine, by forming the above-mentioned temporary layer.

The edging operation is considered as satisfactory when the lens is subjected during such operation to an offset not higher than 3°, more preferably not higher than 2°. The edging operation is considered as optimal when the lens is subjected during such operation to an offset equal to or lower than 1°.

A specific embodiment of an edging operation according to the invention is more precisely disclosed in connection with examples of the invention.

The at least one temporary layer formed on the surface of the optical article in accordance with the present invention can be easily removed/peeled from the optical article after completing the edging operation and removing the fixing chuck and pad. The removal step of the temporary layer can be carried out either in a liquid medium, or through mechanical action, such as friction and/or contact, or through implementation of those two alteration means. Elimination with a liquid medium is preferably made with an acidic aqueous solution, in particular a solution of orthophosphoric acid with molarities ranging from 0.01 to 1 N. The acidic solution may also include surfactants, anionic, cationic or amphoteric. A soapy aqueous solution can also be used as liquid media.

The temperature at which the removal step is carried out is variable but generally, it occurs at room temperature.

Mechanically alterable through friction and/or contact according to the invention means a coating capable of being removed after having been subjected to a dry wiping/sweeping, comprising 5 to and fro movements on the wiping area with a Wypall L40® cloth from the KIMBERLY-CLARK corporation, while maintaining a 3 kg/cm² pressure. In one embodiment of the invention, the temporary coating is advantageously brittle, i.e. it may be removed after being subjected to a dry wiping comprising 5 to and fro movements on the wiping area with the above-mentioned Wypall cloth, while maintaining a 60 g/cm² pressure.

Removing the temporary coating could also be enhanced through a mechanical action using ultrasounds.

After the processing with the liquid medium such as the acidic solution, the dry wiping or the combination of both, the removal step could comprise a cleaning step by means of an aqueous solution with a pH substantially equal to 7.

Subsequently to the removing of the temporary layer, the recovered optical article exhibits optical and surface properties of the same order as those of the initial optical article (even nearly identical) before the temporary coating was deposited. The organic material in accordance with the invention should thus be chosen such that a definitive degradation of the material of the optical article's outermost layer is avoided. This is particularly interesting for optical articles comprising a hydrophobic and/or oleophobic coating (as an outermost layer).

The present invention also relates to an optical article having two main faces, at least one of which being coated with an outermost layer, wherein at least one temporary layer of an organic material is formed on said outermost layer of said optical article, the organic material of the temporary layer comprising at least one organic compound having a fluorinated functional moiety, and a linking functional moiety capable of establishing at least one intermolecular bond or interaction, preferably with an adhesive material, more preferably with a pressure sensitive adhesive.

Preferably, said organic compound has a main chain with two terminal positions, the first terminal position being occupied by the fluorinated functional moiety, and the second terminal position being occupied by the linking functional moiety capable of establishing at least one intermolecular bond or interaction, preferably with the adhesive material of a holding pad such as defined previously.

The above organic material is such as defined previously, and may increase the surface energy of the optical article, preferably up to at least 12 mJ/m², more preferably up to at least 15 mJ/m². More particularly, the fluorinated functional moiety is advantageously a linear perfluoroalkyl group with less than four carbon atoms, and the linking functional moiety is able to form at least one hydrogen bond, preferably with the adhesive material of a holding pad such as defined previously. The fluorinated functional moiety and the linking functional moiety are preferably connected to each other by means of a linking arm such as described previously.

As previously described, the outermost layer of the optical article, preferably an ophthalmic lens, is preferably an anti-fouling top coat, which is generally a hydrophobic and/or oleophobic surface coating, and in particular, a hydrophobic and/or oleophobic surface coating deposited on a mono- or multilayered anti-reflection coating or a hard coating.

Also disclosed herein is a method for preparing the above optical article, comprising the steps of:
- providing an optical article having two main faces, at least one of which being coated with an outermost layer,
- forming at least one temporary layer of an organic material on the outermost layer of said optical article, by coating said outermost layer with a coating solution containing at least one organic compound having a fluorinated functional moiety, and a linking functional moiety capable of establishing at least one intermolecular bond or interaction, preferably with an adhesive material, more preferably with a pressure sensitive adhesive.

Preferably, the coating solution is applied using any one of dip coating, spray coating, spin coating, flow coating, brush coating, or vacuum deposition.

Now, the present invention will be described in more detail with reference to the following examples. These examples are provided only for illustrating the present invention and should not be construed as limiting the scope and spirit of the present invention.

EXAMPLES

Example 1

Organic glasses were prepared, bearing three anti-abrasion, anti-reflection, hydrophobic/oil-repellent coatings that are coated in said order on the substrate.

The deposits were achieved on substrates which are polycarbonate ophthalmic lenses comprising, on both sides, an anti-abrasion coating of the polysiloxane type corresponding to example 3 in the Patent Application EP 614957 in the Applicant's name. The treated lenses were round 65 mm diameter lenses. The lenses were washed in an ultra-sound cleaning vessel, steamed for 3 hours minimum at a temperature of 100° C. They were then ready to be treated.

1. Preparation of the Lenses
1.1 Deposition of the Anti-reflection and Hydrophobic/Oleophobic Coating The vacuum treating machine used is a Balzers BAK760 machine provided with an electron gun, an ion gun of the "end-Hall" Mark 2 Commonwealth type and an evaporation source with a Joule effect.

The lenses were placed on a carrousel provided with circular openings intended to accommodate the lenses to be treated, the concave side facing the evaporation sources and the ion gun.

A pumping operation was performed until a secondary vacuum is reached. The substrate surface was activated by irradiating it with an argon ion beam, using the Mark 2 ion gun.

Then, after the ion irradiation has been interrupted, a successive evaporation of four anti-reflection optical layers was performed, with the electron gun. The four deposited layers were: a high index layer (HI), a low index layer (LI), a high index layer (HI), and a low index layer (LI): $ZrO_2/SiO_2/ZrO_2/SiO_2$.

Finally, a hydrophobic and oleophobic coating layer of an OPTOOL DSX coating solution, sold by DAIKIN Industries, was deposited through dip coating. The thickness of the resulting hydrophobic and oleophobic coating ranged from 2 to 5 nm.

1.2 Deposition of the Temporary Layer

The temporary layers were deposited onto the outermost layer (OPTOOL DSX top coat) of the above prepared lens by spin coating (700 rpm during 20 seconds).

The deposited organic material was either 1H,1H-pentafluoropropan-1-ol of formula (II), or 1H,1H,2H,2H-tridecafluoro-octan-1-ol of formula (III), or bis(1H,1H,2H,2H-trifluoropropyl)tetramethyl disiloxane of formula (IV), or KP 801M of formula (V). The organic material was mixed in Demnum solvent from Daikin (or HFE 7100 from 3M) with a weight ratio of 75% solvent. The physical thickness of the deposited layer was between 5 and 10 nm.

The lenses were then turned upside down and the convex side oriented towards the treatment area. The convex side was treated identically to the concave side (reproducing the steps 1.1 and 1.2 here above).

2. Edging of the Lenses

All the lenses used, prepared as described above, were +4.00 −2.00 (unless otherwise noted) and comprised a hard coat. The edging was performed using half eye secure Edge™ by Saint Gobain as holding pads (squares), half eye blocks (chucks) from Essilor Corporation and medium clamping for polycarbonate. The lenses were blocked at 90° using the pad and chuck. The pads were manually glued on the chuck and the chuck+pad system was manually glued on the convex side of each lens. The frame used for edging was a Charmant ref. 8320, model 05, size 51.

The resulting lenses were subjected to a conventional edging operation on a grinding machine Kappa from Essilor Corporation (The plastic polycarbonate preform grinding machine had a 155 mm diameter and ran at 2850 rpm). After the edging process, the lenses were placed in a plastic test framed where the shape lenses fit perfectly. The axis was measured again using a CLE 60 frontofocometer, according to the ISO 8980-2: 2004 standard, giving the value of the offset. The edging operation was repeated several times and the average of offset was calculated.

The offset results ("Delta") obtained with lenses coated with a temporary layer made of any one of compounds of formulae (II) to (V) are presented in talbles 1 to 4.

TABLE 1

| 1H,1H,2H,2H-tridecafluoro-octan-1-ol results | | |
|---|---|---|
| Initial Angle | Final Angle | Delta |
| 90 | 90 | 0 |
| 90 | 87 | 3 |
| 90 | 90 | 0 |
| 90 | 88 | 2 |
| 90 | 89 | 1 |
| 90 | 88 | 2 |

TABLE 1-continued 1H,1H,2H,2H-tridecafluoro-octan-1-ol results

| Initial Angle | Final Angle | Delta |
|---|---|---|
| 90 | 88 | 2 |
| 90 | 88 | 2 |
| 90 | 89 | 1 |
| 90 | 88 | 2 |

TABLE 2

1H,1H-pentafluoropropan-1-ol results

| Initial Angle | Final Angle | Delta |
|---|---|---|
| 90 | 90 | 0 |
| 90 | 90 | 0 |
| 90 | 90 | 0 |
| 90 | 90 | 0 |
| 90 | 91 | 1 |
| 90 | 89 | 1 |
| 90 | 90 | 0 |
| 90 | 89 | 1 |
| 90 | 90 | 0 |
| 90 | 89 | 1 |

TABLE 3

Bis(1H,1H,2H,2H-trifluoropropyl) tetramethyl disiloxane results

| Initial Angle | Final angle | Delta |
|---|---|---|
| 90 | 89 | 1 |
| 90 | 89 | 2 |
| 90 | 88 | 2 |

TABLE 4

KP 801M results

| Initial angle | Final angle | Delta |
|---|---|---|
| 90 | 90 | 0 |
| 90 | 90 | 0 |
| 90 | 89 | 1 |
| 90 | 88 | 2 |
| 90 | 90 | 0 |
| 90 | 89 | 1 |
| 90 | 89 | 1 |
| 90 | 88 | 2 |
| 90 | 89 | 1 |
| 90 | 89 | 1 |

Tables 1 to 4 reveal that compounds of formulae (II) to (V), which are organic compounds in accordance with the invention, lead to good offset results (offset not higher than 3°, and generally less than 2°). The best results were obtained with 1H,1H-pentafluoropropan-1-ol (II), with which the temporarily coated lens exhibits an optimal ability to undergo edging. In all cases, no adhesion loss of the holding pad could be observed.

Moreover, compounds of formulae (II) to (V) allow for a wide selection of adhesive materials for holding pads, as well as a wide selection of inks for marking the lenses.

In the absence of the temporary coating, it is impossible to obtain a good edging.

3. Removal of the Temporary Layer

The cleanability of temporary layers of the invention was then investigated. After having been subjected to edging, lenses coated with a temporary layer of 1H,1H-pentafluoropropan-1-ol were hand wiped dry so as to remove the temporary layer.

The resulting lenses showed excellent optical features as well as excellent hydrophobic and oil-repellent properties, identical to those of lenses onto which OPTOOL DSX™ was deposited by dip coating but which were not coated with a temporary layer.

At that stage, the recovered edged lenses could be directly inserted into the frame they were intended to be inserted into.

Example 2

Piano Orma® lenses coated with anti-reflection and hydrophobic/oleophobic coatings as in example 1, are spin coated (700 rpm during 20 seconds) with the following temporary layer compositions.

| Lens n° | Coating composition 1H,1H-Pentafluoropropanol-1 (wt %) |
|---|---|
| 1 | 10 |
| 2 | 30 |
| 3 | 50 |

The solvent used is Demnum solvent from Daikin or HFE7100 from 3M

Water contact angles, hysteresis and surface energy of the temporary layers are determined. Results are given in the table below.

| Lens n° | Water contact angle (°) | | Hysteresis (°) | Surface energy |
|---|---|---|---|---|
| | θa | θr | Δθ | mJ/m$^2$ |
| 1 | 117.1 | 94.6 | 22.5 | 15.5 |
| 2 | 118.2 | 95.8 | 22.2 | 13.9 |
| 3 | 120.4 | 110.0 | 10.0 | 13.1 |

All measurements have been made four months after obtention of the coated lenses.

Surface energy has been measured according to Owens-Wendt using two liquids (water and diiodomethane).
Determination of Contact Angles and Hysteresis
Hysteresis Measurements
Material
    Digidrop apparatus, version 4-12 from GBX using the plunging needle mode.
    Syringe: Ref DGD-SP-1 5 from GBX volume 1 ml.
    Needle: Ref DGD-SP-N9 Inner diameter: 0.09 mm—Outer diameter: 0.18 mm
    Liquid: Deionized water conductivity between 0.3 μS et 1 μS (water is renewed any 4 hours)
    Room conditions: temperature 23° C.+/−5° C. and relative humidity 50+/−10%
Parameters:
    Method of measurement: manual swelling and reducing a water drop using a micrometric screw
    The needle has to be positioned at the center of the drop during the whole duration of the measurements.
    Measurement mode: to have photographies taken during the swelling and reducing the water drop. (photography taken 2 to 3 seconds after a volume change).

Analysis mode of the shape of the drop by using the mixt mode automatically calculating left and right contact angles from the line basis manually positioned by the operator.

The line basis is positioned by overlapping the line basis and the interface drop-substrate.

When there is more than 3° between the left angle and the right angle, measurement is not taken into account.

Visualisation mode of measured angles during swelling and reducing the water drop:

either directly on the measurements table or graphically by tracing the angles as a function of the line basis. For every image analysis, the angles reported on the graphics are the mean value of the right and left contact angles.

Sample Preparation:

for measurements made on the temporary layer, the coated substrate is subjected to a slight blowing with compressed air (deoiled), and then the measures are effected.

For measurements on the hydrophobic/oleophobic top coat the temporary layer is wiped off with a Wypall 40 cloth, washed with soapy water and rinsed. Then, it is wiped with CEMOI.

One hour after, the coated substrate is air blown and subjected to measurements.

Measurement of Hysteresis

The measurements are made using 3 water drops which are deposited at the surface of the sample, one at the center of the sample and two close to the periphery, apart form the center.

Pre test measurement (positioning before measurements)

Deposit a water drop and position the height of the plate supporting the sample so that the needle sufficiently penetrates the drop without touching the surface of the sample on which the drop is deposited.

Center the needle inside the drop.

Position the basis line, define the area of the image which should comprise water drop, needle and water drop reflected image.

Swell and reduce the drop to ensure that the needle is correctly centered during the whole operation.

Measurement:

First Phase: Determination of Advancing Contact Angle (Designated by AA or $\theta_a$)

Measurements of angles during swelling of the water drop.

Initial drop volume≈5 μl, make the initial measurement and go on slowly swelling the drop by adding 3 μl each time, wait 2 to 3 seconds for the stabilization of the angle, then measure the mean angle and repeat each time the operation up to getting a stabilization with an increase of the contact line. (Maximum volume may be for example≈24 μl)

The advancing contact angle is the one at the time where the interface line air/water /surface begins to move.

It is calculated by calculating the mean value of the right and left contact angles measured during swelling.

Second Phase: Determination of Receding Contact Angle. (Designated as AR or $\theta_r$)

Slowly pumping the water drop (1 μl each time) up to getting a movement of the interface on the line basis.

The receding contact angle begins at the time where the interface line air/water/surface begins to move. It is calculated by calculating the mean value of the right and left contact angles measured during pumping.

Pump up to reaching the initial volume (≈5 μl)

The total measurement takes around 1 minute.

Then position two other drops at the periphery and make the measurements of AA and AR as described above.

Calculate the mean AA and the mean AR for each sample.

Then calculate the hysteresis $\Delta\theta$ for each sample.

All examples of example 2 successfully passed the trimming test four months after their preparation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for edging an optical article comprising:
providing an optical article having two main faces, at least one of which is coated with an outermost layer;
fixing the optical article to a chuck with a holding pad inserted there between and adhering to both the optical article and the chuck, the surface of the holding pad to be contacted with the optical article being coated with an adhesive material; and
edging the optical article with an edging device;
wherein prior to the step of fixing the optical article to the chuck, at least one temporary layer of an organic material is formed onto said outermost layer of the optical article, the organic material of the temporary layer comprising at least one organic compound having a fluorinated functional moiety, and a linking functional moiety capable of establishing at least one intermolecular bond or interaction with the adhesive material of the holding pad.

2. The method of claim 1, wherein said at least one organic compound has a main chain with two terminal positions, the first terminal position being occupied by the fluorinated functional moiety, and the second terminal position being occupied by the linking functional moiety capable of establishing at least one intermolecular bond or interaction with the adhesive material of the holding pad.

3. The method of claim 1, wherein said outermost layer of the optical article is an anti-fouling top coat.

4. The method of claim 3, wherein the anti-fouling top coat is further defined as a hydrophobic and/or oleophobic surface coating.

5. The method of claim 1, wherein the adhesive material is a pressure sensitive adhesive (PSA).

6. The method of claim 1, wherein the anti-fouling top coat is made from a composition comprising at least one fluorinated compound.

7. The method of claim 6, wherein the anti-fouling top coat comprises a fluorine-based resin comprising perfluoropropylene moieties.

8. The method of claim 1, wherein the outermost layer of the optical article has a surface energy lower than or equal to 14 mJoules/m$^2$.

9. The method of claim 8, wherein said outermost layer of the optical article has a surface energy lower than or equal to 12 mJoules/m$^2$.

10. The method of claim 1, wherein the temporary layer imparts to the optical article a surface energy at least equal to 12 mJ/m$^2$.

11. The method of claim 10, wherein the temporary layer imparts to the optical article a surface energy at least equal to 15 mJ/m$^2$.

12. The method of claim 1, wherein the temporary layer imparts to the optical article a surface energy of 12 to 15 mJ/m$^2$ and a hysteresis of the water contact angle of at least 8°.

13. The method of claim 12, wherein the temporary layer imparts to the optical article a surface energy of 12 to 15 mJ/m² and a hysteresis of the water contact angle of at least 9°.

14. The method of claim 13, wherein the temporary layer imparts to the optical article a surface energy of 12 to 15 mJ/m² and a hysteresis of the water contact angle of at least 10°.

15. The method of claim 1, wherein the temporary layer is a temporary protective layer.

16. The method of claim 1, wherein the at least one temporary layer is formed from a coating material comprising compounds of general formula (I):

$$R_{F,H}\text{-A-L} \qquad (I)$$

wherein $R_{F,H}$ is the fluorinated functional moiety, L is the linking functional moiety and A is a divalent linking arm, including a covalent link.

17. The method of claim 16, wherein $R_{F,H}$ is a linear or branched, polymeric, oligomeric or monomeric, perfluoroalkyl, perfluorooxyalkyl, perfluoroalkylthio, fluoroalkyl, fluorooxyalkyl, fluoroalkylthio group or a mixture thereof.

18. The method of claim 16, wherein $R_{F,H}$ meets the general formula:

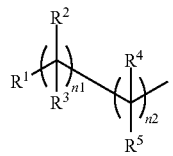

in which $R^1$ represents a trifluoromethyl, a difluoromethyl, a fluoromethyl or a methyl group, $R^2$ to $R^5$ each independently represent a fluorine or an hydrogen atom, $n_1$ and $n_2$ each independently represent an integer ranging from 0 to 10.

19. The method of claim 16, wherein $R_{F,H}$ is a linear perfluoroalkyl group having less than four carbon atoms.

20. The method of claim 16, wherein the linking arm A is selected from:
 alkylene groups, linear or branched, substituted or not substituted;
 cycloalkylene groups, substituted or not substituted;
 alkenylene or alkynylene groups, substituted or not substituted;
 divalent heteroarylene groups, substituted or not substituted;
 arylene groups, substituted or not substituted;
 acyl(cyclo)alkylene groups, acyl(cyclo)alkenylene groups, acyl(cyclo)alkynylene groups, acyl(cyclo)arylene groups, the acyl function being —C(O)—;
 acyloxy(cyclo)alkylene groups, acyloxy(cyclo)alkenylene groups, acyloxy(cyclo)alkynylene groups, acyloxy(cyclo)arylene groups, the acyloxy function being —C(O)O—;
 oxy(cyclo)alkylene groups, oxy(cyclo)alkenylene groups, oxy(cyclo)alkynylene groups, oxy(cyclo)arylene groups;
 thio(cyclo)alkylene groups, thio(cyclo)alkenylene groups, thio(cyclo)alkynylene groups, thio(cyclo)arylene groups, sulfo (—SO₂—) derivatives thereof, sulfoxy (—S(O)—) derivatives thereof;
 amino(cyclo)alkylene groups, amino(cyclo)alkenylene groups, amino(cyclo)alkynylene groups, amino(cyclo)arylene groups;
 alkylamino(cyclo)alkylene groups, alkylamino(cyclo)alkenylene groups, alkylamino(cyclo)alkynylene groups, alkylamino(cyclo)arylene groups;
 arylamino(cyclo)alkylene groups, arylamino(cyclo)alkenylene groups, arylamino(cyclo)alkynylene groups, arylamino(cyclo)arylene groups;
 NHC(O), OC(O), C(O), NHS(O)₂, NHS(O), OC(O)OC(O), C(O)C(O) groups, which may be connected to $R_{F,H}$ groups as defined below:

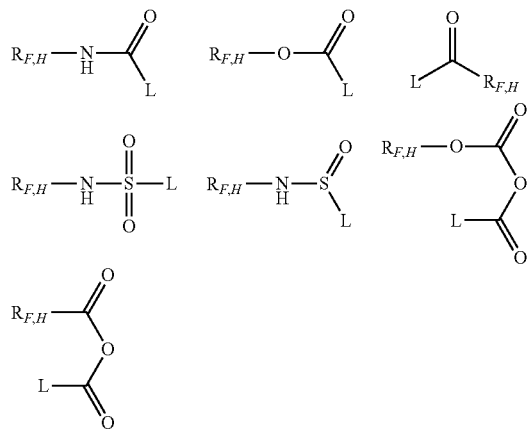

diorganosilylene groups, optionally substituted with an alkylene, arylene, alkenylene or alkynylene group;
 or combinations of groups from the same or a different category.

21. The method of claim 16, wherein the linking arm A is a $C_1$-$C_4$ n-alkyl group.

22. The method of claim 21, wherein the linking arm A is methylene or ethylene.

23. The method of claim 16, wherein the linking functional moiety comprises at least one group prone to establish at least one covalent bond with the adhesive material of the holding pad.

24. The method of claim 16, wherein the linking functional moiety comprises at least one group prone to establish at least one non-covalent bond or interaction with the adhesive material of the holding pad, said bond or interaction being selected from a hydrogen bond, a van der Waals bond, a hydrophobic interaction, an aromatic CH-π interaction, a cation-π interaction or a charge-charge attractive interaction.

25. The method of claim 24, wherein the linking functional moiety comprises at least one group prone to establish at least one hydrogen bond with the adhesive material of the holding pad, said group being a hydrogen bond-donor and/or a hydrogen bond-acceptor.

26. The method of claim 25, wherein the hydrogen bond-donor group is selected from the following groups:

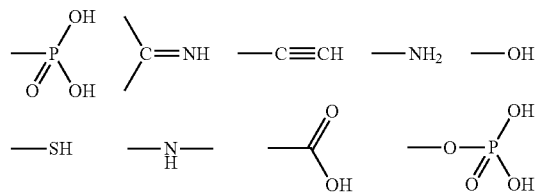

-continued

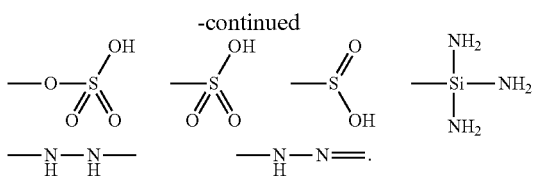

27. The method of claim 25, wherein the hydrogen bond-acceptor group is selected from the following groups:

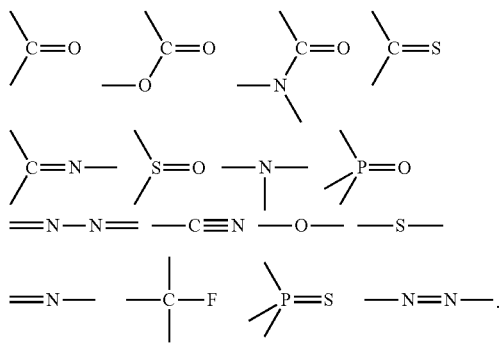

28. The method of claim 1, wherein the at least one temporary layer is formed from a coating material comprising compounds of formulae (II) to (V):

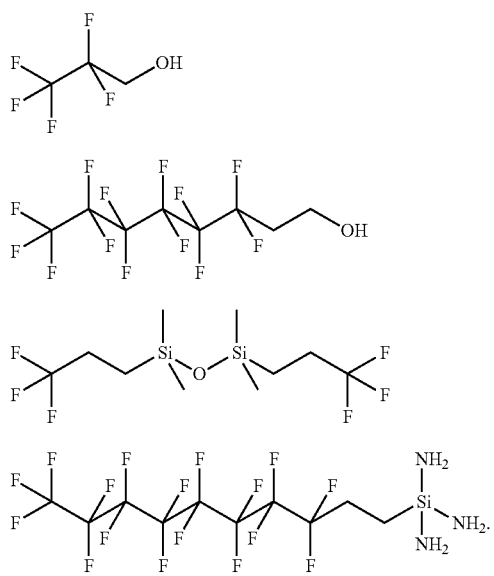

29. The method of claim 1, wherein the at least one temporary layer of an organic material is formed from a coating solution comprising the coating material and at least one solvent selected from fluorinated solvents and alcanols.

30. The method of claim 29, wherein the solvent is a fluorinated solvent, selected from fluorinated alkanes, perfluoro alkanes, fluorinated ether oxides, perfluoroalkyl alkyl ether oxides, and mixtures thereof.

31. The method of claim 1, wherein the physical thickness of the temporary layer ranges from 1 to 100 nm.

32. The method of claim 31, wherein the physical thickness of the temporary layer ranges from 5 to 50 nm.

33. The method of claim 1, wherein the two main faces of the optical article are coated with an outermost layer coated with the temporary layer.

34. The method of claim 1, wherein the temporary layer is coated on an area covering the whole surface of at least one of the two main faces of the optical article.

35. The method of claim 1, wherein the temporary layer is coated only on the area of said optical article intended to be in contact with the holding pad.

36. The method of claim 1, wherein the temporary layer is removable through mechanical action or treatment in a liquid medium, after the optical article has been edged.

37. The method of claim 1, wherein the optical article is subjected to an offset not higher than 3° during edging thereof.

38. The method of claim 37, wherein the optical article is subjected to an offset equal to or lower than 2° during edging thereof.

39. The method of claim 38, wherein the optical article is subjected to an offset of 1° during edging thereof.

40. The method of claim 1, wherein the optical article is an ophthalmic lens.

41. A method for preparing an optical article having two main faces, at least one of which is coated with an outermost layer, wherein at least one temporary layer of an organic material is formed on said outermost layer of said optical article, the organic material of the temporary layer comprising at least one organic compound having a fluorinated functional moiety, and a linking functional moiety capable of establishing at least one intermolecular bond or interaction, the method comprising:

providing an optical article having two main faces, at least one of which is coated with an outermost layer; and forming at least one temporary layer of an organic material on the outermost layer of said optical article, by coating said outermost layer with a coating solution containing at least one organic compound having a fluorinated functional moiety, and a linking functional moiety capable of establishing at least one intermolecular bond or interaction.

42. The method of claim 41, wherein the coating solution is applied using any one of dip coating, spray coating, spin coating, flow coating, brush coating or vacuum deposition.

* * * * *